United States Patent [19]
Jones

[11] 4,431,084
[45] Feb. 14, 1984

[54] INDUSTRIAL TRUCK

[75] Inventor: Robert E. Jones, Lexington, Ky.

[73] Assignee: Clark Equipment Company, Buchanan, Mich.

[21] Appl. No.: 260,969

[22] Filed: May 6, 1981

[51] Int. Cl.$^3$ .............................................. B66B 9/20
[52] U.S. Cl. .................................... 187/9 R; 180/295
[58] Field of Search .......................... 187/9 R, 9 E, 94; 180/13, 11, 12, 14 R, 14 D, 19 H, 19 S, 61, 59, 295, 299; 414/630, 631, 673; 267/166, 179; 248/573, 574, 560, 561

[56] References Cited

U.S. PATENT DOCUMENTS

| 321,157 | 6/1885 | Tat ....................................... | 248/574 |
| 1,836,353 | 12/1931 | Withrow .............................. | 248/574 |
| 2,174,209 | 9/1939 | Genest et al. ........................ | 248/561 |
| 2,520,857 | 8/1950 | Schreck .............................. | 187/9 R |
| 2,643,740 | 6/1953 | Quayle ................................ | 187/9 |
| 3,515,233 | 6/1970 | Stammen ............................. | 180/13 |
| 3,756,350 | 9/1973 | Gandolfo et al. .................... | 187/9 R |

FOREIGN PATENT DOCUMENTS

| 22478 | of 1913 | United Kingdom .................. | 180/13 |
| 760670 | 11/1956 | United Kingdom ................. | 180/295 |

OTHER PUBLICATIONS

Hyster Ordermaster 30CA Specifications.
Hyster Ordermaster 30C Specifications.
Raymond Model 14 Orderpicker, Yale OS-Order Selector and FS-Furniture Selector Industrial Trucks Primary Examiner—Joseph J. Rolla
Assistant Examiner—Kenneth Noland
Attorney, Agent, or Firm—John C. Wiessler; Kenneth C. Witt

[57] ABSTRACT

A straddle type material handling industrial truck providing an approximately constant force on the traction and braking wheel through pivotal mounting of the drive unit augmented by spring loading. The spring loading is accomplished by a spring mechanism which includes an upper spring bracket having a downwardly extending stop portion and mounted on the frame, a lower spring bracket having an upwardly extending stop portion and mounted on the drive unit, and a compression spring extending between the spring brackets, the stop portions being located within the compression springs and spaced apart a predetermined amount to limit the upward pivotal movement of the drive unit.

8 Claims, 6 Drawing Figures

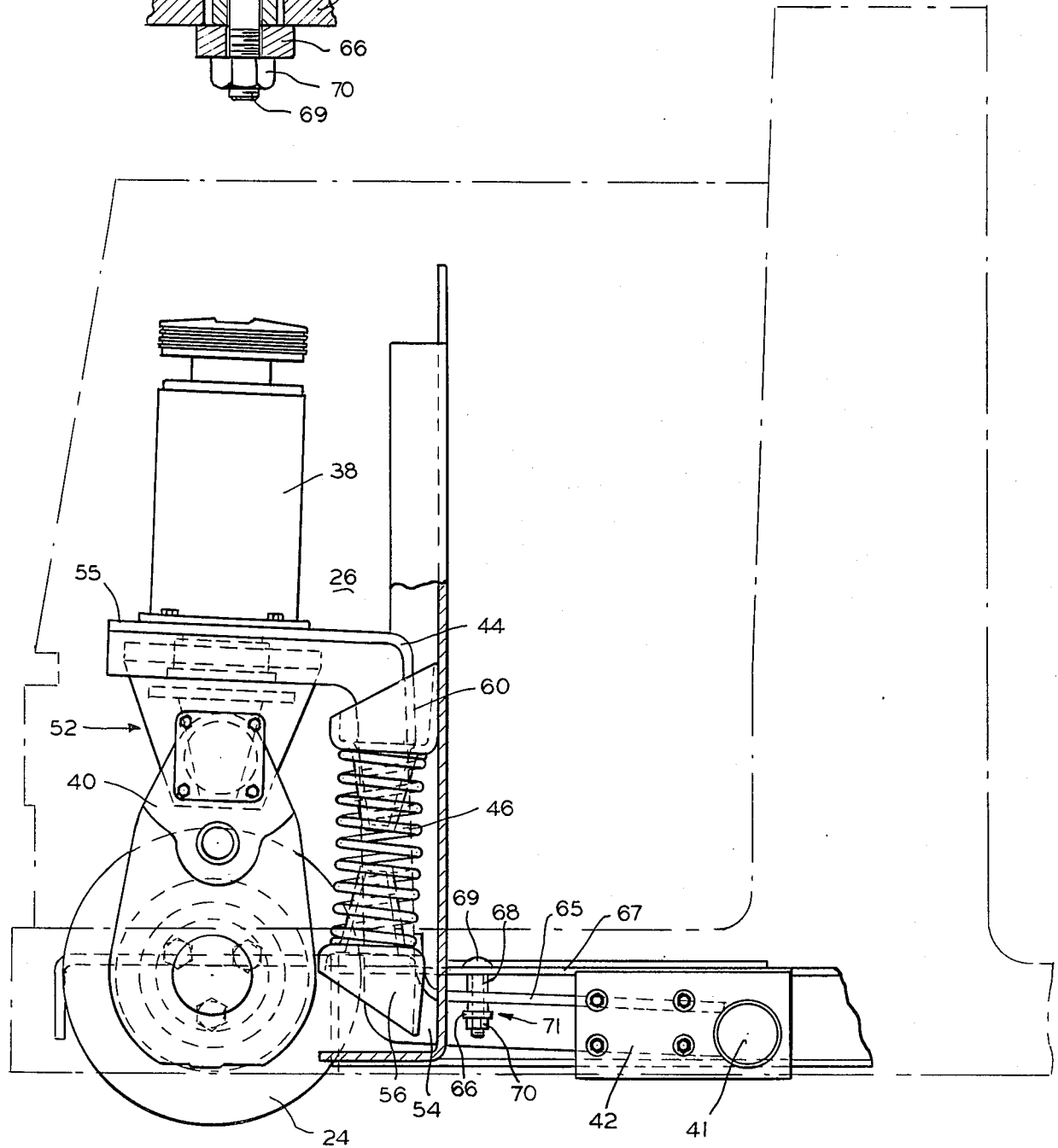

INDUSTRIAL TRUCK

BACKGROUND OF THE INVENTION

1. Field of the Invention

This invention relates to material handling industrial trucks and is particularly suitable for an industrial truck which includes a mobile frame having a centrally located mast or upright structure upon which a load carriage is mounted for lifting and lowering movement. The load carriage may include an operator's station which moves upwardly and downwardly with the load.

2. Description of the Prior Art

The industrial truck mentioned is the non-counterbalanced or straddle type. The frame extends sufficiently to the front and rear of the mast structure, and laterally, to provide stability. At the front of the machine the frame may be equipped with caster wheels near the outer edges together with a centrally located steerable traction wheel to provide propulsion and braking. At the rear of the vehicle unidirectional wheels are located on outrigger portions of the frame which are sufficiently long and spaced apart to afford stability.

It is known also to assemble a counterbalanced type industrial truck from some of the same sub-assemblies or modules as are used for the already described straddle type. In the counterbalanced type industrial truck the frame is shortened at the rear and the caster wheels at the front are omitted. Then, if the drive wheel is properly secured with respect to the frame, a counterbalanced type industrial truck can be produced from some of the same modules used in the straddle type industrial truck.

U.S. Pat. No. 3,756,350 Gandolfo et al, dated Sept. 4, 1973, discloses industrial truck modules which can be assembled to form either the straddle type or the counterbalanced type industrial truck described in the preceding two paragraphs. The industrial truck shown in FIGS. 1, 3 and 5 of that patent is the straddle type while that shown in FIGS. 2 and 4 is the counterbalanced type.

In the Gandolfo et al patent the power module includes the storage battery which provides energy for operating the industrial truck, along with a propulsion motor and drive unit, and a second motor for driving a hydraulic pump that serves to raise and lower the movable mast and actuate other devices. Also the electrical traction controls and the hydraulic supply tank are located in the power module along with the necessary electrical and hydraulic connections.

In the foregoing patent the entire power module is pivotally mounted in order to accommodate the drive wheel, which is the fifth wheel of the industrial truck, to the floor or road surface with sufficient force to provide adequate traction and braking. The power module is pivotally mounted on a transverse horizontally disposed axis in front of the mast structure.

U.S. Pat. No. 2,643,740 Quayle, dated June 30, 1953, discloses a five wheel straddle type truck with a similar pivoted power module except the pivot axis is rearwardly of the mast. The bottom of the hydraulic ram which operates the lift mechanism on the mast rests on the pivoted structure so that the force on the traction wheel varies responsively to the weight carried on the mast of the industrial truck. In Quayle as in Gandolfo et al the entire power assembly including the battery, traction wheel and motor, hydraulic reservoir and pump, and other components are included in the pivoted power module.

U.S. Pat. No. 3,515,233 Stammen, dated June 2, 1970, shows a straddle type industrial truck in which the power module moves with respect to the frame by sliding on the mast instead of pivoting, and tension springs are provided on each side of the mast structure to transfer part of the weight of the power module to the frame leaving only a portion of it on the drive wheel.

It is known to construct a five wheel straddle type industrial truck similar to those shown in the Gandolfo et al and Quayle patents in which the pivotally mounted power module includes the battery along with the traction wheel, motor and gearing, but, does not include the hydraulic reservoir and pump.

Stability of the industrial truck plus the smoothness and ease of operating it over the floor are important in industrial trucks of the type under discussion, particularly since the operator may be elevated on the load carriage. One of the most important elements affecting these characteristics is the storage battery which is utilized to propel the vehicle. Such a battery in a typical vehicle of this type may vary from about 1,000 lbs. (450 kg.) to about 2,000 lbs. (900 kg.). Such a variation can occur for a single industrial truck because of the availability of a different size battery while the regular battery is being recharged, for example. Also an industrial truck of this type may be operated under some circumstances without any battery by the use of jumper cables typically used to move the truck during maintenance or to operate the truck in applications where the truck is used in fixed guidance path(s) using a remote power source (possibly rectified alternating current) to the truck through flexible power cables.

SUMMARY OF THE INVENTION

In the industrial truck of the present invention only the drive unit comprising the steerable traction wheel and drive motor is pivoted. The battery is not included in the pivoted structure in order to minimize the variation in battery weight as a factor in the stability and driving and braking characteristics of the industrial truck.

BRIEF DESCRIPTION OF THE DRAWING

FIG. 3 is a partial side view in phantom showing the pivoted drive unit of the invention, FIG. 3B is a fragmentary view of a stop structure.

DESCRIPTION OF THE PREFERRED EMBODIMENT

Figure 1:
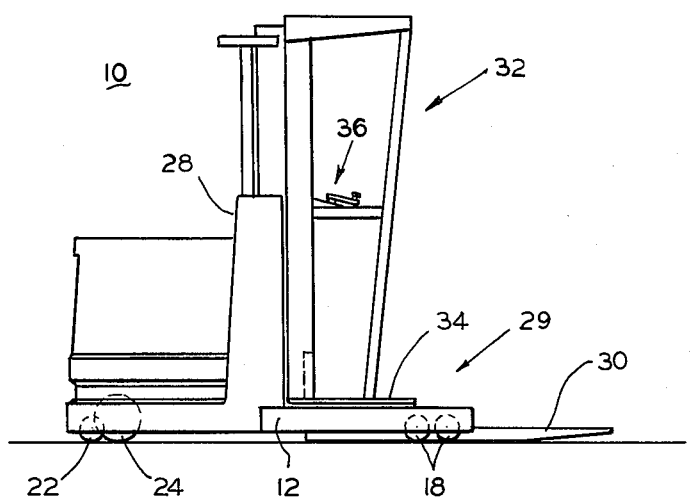
FIG. 1 of the drawing is a side elevation of an industrial truck embodying this invention.
Figure 2:
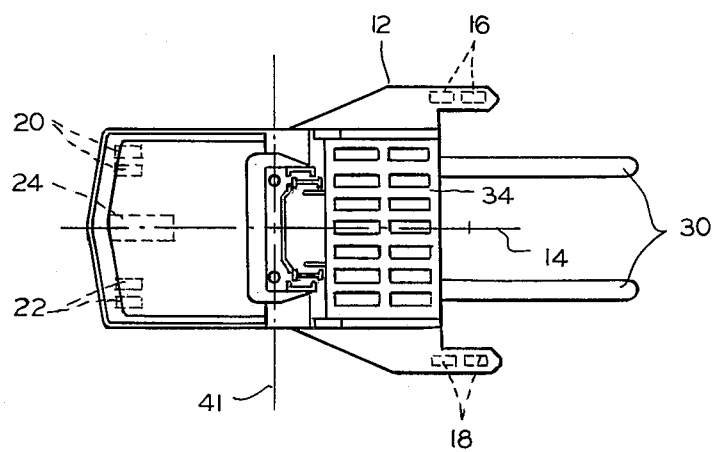
FIG. 2 is a top plan view of the same industrial truck.

The numeral 10 designates generally a battery powered industrial truck embodying this invention. The vehicle 10 includes a rigid frame 12 having a longitudinal axis 14 and including a pair of unidirectional rear wheels 16 on one side of the frame and another pair of unidirectional rear wheels 18 on the other side. At the front the vehicle has dual caster wheels 20 on one side and dual caster wheels 22 on the other side; these wheels swivel as required during operation. Centrally located at the front of the vehicle is a traction wheel 24. This wheel and its associated structure are part of a pivotally mounted drive unit 26 which is shown in FIGS. 3 and 4.

As shown the industrial truck 10 includes an extendible mast or upright structure 28 which is mounted on frame 12. Carried on the mast structure is a load carriage 29 including fork tines 30 and an operator's station indicated generally at 32 which includes an operator's platform 34 and controls at 36.

Figure 3A:
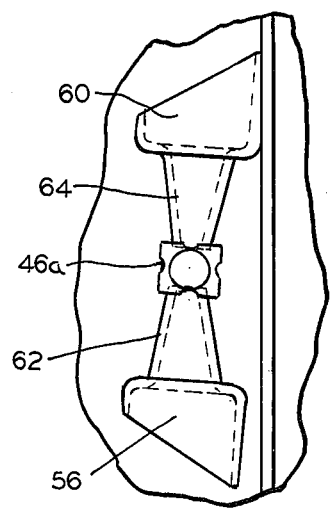
FIG. 3A is a fragmentary view of a modified portion of FIG. 3.
Figure 4:
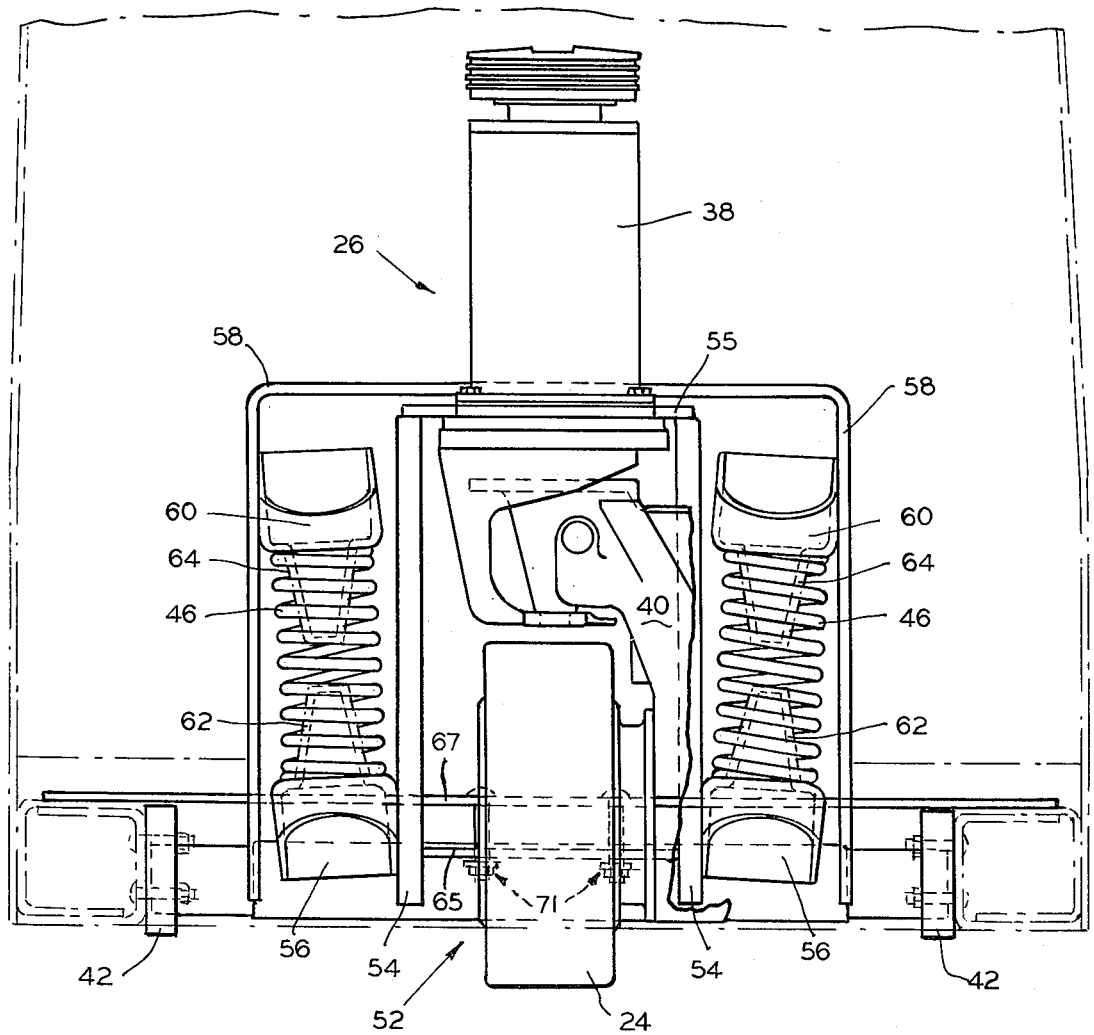
FIG. 4 is an end elevational view of the drive unit of FIG. 3.

As shown in FIGS. 3 and 4 the drive unit 26 includes in addition to traction wheel 24 an electric motor 38 for operating the wheel 24. Between the motor 38 and wheel 24 a gear speed reduction unit 40 may be provided, and as shown it is also a part of the drive unit structure. The drive unit 26 is a part of a subassembly 52 which is mounted on frame 12 for pivotal movement about a transverse horizontal axis 41. The subassembly 52 includes a subframe 42 to which a pair of vertical structural members 54 are rigidly secured. Across the top of members 54 is secured a horizontal structural member 55 and the power unit 26 is mounted on member 55 for swivel movement to provide for steering of the industrial truck by turning wheel 24.

A pair of lower spring brackets 56 is secured to the vertical structural members 54 as part of the subassembly 52. The frame 12 includes a forwardly projecting inverted U-shaped structural portion 58 and a pair of upper spring brackets 60 are secured respectively to the opposite sides of member 58. A pair of compression springs 46 are located between the lower spring brackets 56 and the upper spring brackets 60.

The structure described provides for limited pivotal movement of subassembly 52, including the drive unit 26, with respect to frame 12 about axis 41 adjacent the mast. The upward pivotal movement may be limited by central stop members 62 and 64 which are located respectively on brackets 56 and 60, the respective pairs of stop members 62,64 being spaced apart in the static condition by an amount equal to the desired limit on the upward pivotal movement of subassembly 52.

Similarly downward pivotal movement of subassembly 52 is limited by closure of its horizontal member 65 on washer 66 which is spaced from the horizontal plate 67 portion of frame 12 by spacer 68 and held in place with plate 67 by bolt 69 and nut 70; see FIGS. 3 and 3B where the downward stop assembly is indicated generally by the numeral 71. There may be two downward stop assemblies, if desired, as illustrated in FIG. 4.

The drive unit 26, including the motor 38, reduction gear mechanism 40 and the wheel structure 24 provides a known force urging the wheel against the supporting surface on which the wheel is operated; this force is augmented by the force provided by springs 46 to provide the optimum amount of force on the wheel 24 for both propulsion and braking, which force is approximately constant under all operating conditions. It is easy to select springs 46 the force of which when added to that provided by the weight of the drive unit will be the optimum for a particular industrial truck configuration.

As shown in fragmentary view FIG. 3A it is possible readily to substitute a rigid strut 46a for the compression spring 46. By making such a substitution for both springs 46 and omitting the two dual caster wheels it is possible to use the same drive unit and other modules to assemble a three wheel counterbalanced type industrial truck instead of the five wheel straddle type industrial truck illustrated and described herein.

In addition to the previously mentioned advantage of nearly constant traction and braking capacity for the vehicle, regardless of battery weight or use of a battery at all, this invention also provides other advantages. The use of a nonpivoted battery and hydraulic pump and reservoir allows routing of hoses, electrical power cables, electrical control wires, and mechanical linkages from the front compartment of the vehicle to the operator's station on the mast structure without routing through flexing joints which restrict design and cause unnecessary wear and shorter life for the members thus routed. This configuration also allows components to be mounted in the area between the front compartment and the rigidly mounted mast structure without varying clearance during operation.

While I have described and illustrated my invention in the best mode contemplated for carrying it out, it will be appreciated that modifications may be made. Accordingly, I intend to cover by the appended claims all modifications and equivalents falling within the true spirit and scope of this invention.

I claim:

1. A battery powered industrial truck having a rigid frame, two unidirectional wheels one on each side adjacent one end of the frame, two caster wheels one on each side adjacent the other end of the frame, and a battery mounted in a fixed position on the frame, comprising:
    a drive unit pivotally mounted on the frame for pivoting about a transverse horizontally disposed axis,
    said drive unit comprising a steerable drive wheel and a drive motor,
    said drive wheel located adjacent the other end of the frame and between the said caster wheels,
    a spring mechanism connected between the frame and said drive unit for augmenting the force exerted by the weight of the drive unit on the supporting surface for the drive wheel,
    said spring mechanism comprising,
    at least one upper spring bracket having a downwardly extending stop portion and mounted on said frame,
    at least one lower spring bracket having an upwardly extending stop portion and mounted on said drive unit, and
    a compression spring extending between said spring brackets,
    said stop portions located within said compression spring and spaced apart a predetermined amount to limit the upward pivotal movement of said drive unit, and
    means to permit ready removal of the compression spring and substitution of a fixed structure, whereby a three wheel counter-balanced type industrial truck may be assembled instead of the five wheel type industrial truck,
    said fixed structure comprising a rigid strut joining together said stop portions.

2. A battery powered industrial truck as in claim 1 having a centrally located mast structure and an elevatable load carriage on said mast structure.

3. A battery powered industrial truck as in claim 2 including an operator's station which is elevatable with said load carriage.

4. A battery powered industrial truck as in claim 2 in which said drive unit is part of a subassembly which is pivotally mounted on said rigid frame.

5. A battery powered industrial truck as in claim 4 wherein said axis is adjacent said mast structure and said subassembly extends toward said other end of said frame.

6. A battery powered industrial truck as in claim 1 wherein said drive unit includes a gear speed reduction unit.

7. A battery powered industrial truck as in claim 1 which includes stop means for limiting downward pivotal movement of said drive unit.

8. A battery powered industrial truck as in claim 1 wherein said spring mechanism comprises two each of said upper spring brackets, said lower spring brackets and said compression springs.

* * * * *